United States Patent [19]

John, Jr.

[11] Patent Number: 4,804,077

[45] Date of Patent: Feb. 14, 1989

[54] TUBE END PROCESSING SYSTEM

[75] Inventor: Clarence D. John, Jr., Penn Hills Twp., Allegheny County, Pa.

[73] Assignee: Westinghouse Electric Corp., Pittsburgh, Pa.

[21] Appl. No.: 55,561

[22] Filed: May 29, 1987

[51] Int. Cl.[4] .............................................. B65G 47/00
[52] U.S. Cl. ................................ 198/339.1; 198/774; 198/861.1; 72/306; 72/405
[58] Field of Search ..................... 198/339.1, 621, 630, 198/774, 775, 861.1, 955; 414/222, 750; 72/306, 405

[56] References Cited

U.S. PATENT DOCUMENTS

| | | |
|---|---|---|
| 2,043,556 | 6/1936 | Protin . |
| 2,902,139 | 9/1959 | Brenk et al. . |
| 3,355,008 | 11/1967 | Milazzo . |
| 3,512,628 | 5/1970 | Keough . |
| 3,850,287 | 11/1974 | Petros . |
| 3,869,040 | 3/1975 | Rice . |
| 4,024,946 | 5/1977 | Muller et al. . |
| 4,071,137 | 1/1978 | Fink ................................. 198/774 |
| 4,102,173 | 7/1978 | Saloom .............................. 72/306 |
| 4,300,672 | 11/1981 | Millar et al. . |
| 4,353,457 | 10/1982 | Haley . |
| 4,440,292 | 4/1984 | Regenbrecht . |
| 4,511,029 | 4/1985 | Okawa ................................ 198/621 |
| 4,516,307 | 5/1985 | Beard et al. . |
| 4,522,276 | 6/1985 | Fogg et al. . |
| 4,554,128 | 11/1985 | Parker et al. . |
| 4,589,082 | 5/1986 | Parker et al. . |
| 4,653,344 | 3/1987 | Nelson ............................... 198/774 |

Primary Examiner—Joseph E. Valenza

[57] ABSTRACT

A system for processing both ends of tubes, such a nuclear fuel rod cladding tubes. A conveyor, adjustable for different length tubing, supports and transversely moves the tubes to tube-end-processing sites. The conveyor is spaced up at the first-tube-end-processing sites to create first access areas. First-tube-end-processing machines have bases with a portion placed underneath the conveyor in these first access areas. The first machines have tube-end-processing modules movably mounted on the bases to accommodate different length tubing. The system also includes second-tube-end-processing machines having tube-end-process modules positioned at the second-tube-end-processing sites. The modules process the tube ends with such operations as deburring, attaching fittings for flush etching the tubes, etc. Preferably, the modules are aligned for the system to process both ends of a tube simultaneously.

11 Claims, 2 Drawing Sheets

TUBE END PROCESSING SYSTEM

BACKGROUND OF THE INVENTION

The present invention relates generally to processing tubing and, more particularly, is concerned with a system for processing both ends of tubes, such as nuclear fuel rod cladding tubes.

An operational step in the nuclear fuel fabrication process is the manufacture of fuel rod cladding tubes. Such tubes typically are made of a zirconium alloy and have a length between about eight and twelve feet, an outside diameter of about 0.374 inch, and a thickness of about 0.023 inch. These tubes are loaded with uranium-containing nuclear fuel pellets and sealed at both ends with end plugs. The loaded tubes, now called nuclear fuel rods, are grouped into fuel assemblies which are loaded into the core of a nuclear reactor. A liquid moderator/coolant, such as water, is pumped through the core of the reactor and directed to pass along the fuel rods of the fuel assembly in order to extract heat generated therein by the fuel pellets for the production of useful work, such as the generation of electrical power.

During the manufacture of a fuel rod cladding tube, the tube ends undergo various processing steps. For example, each tube end may be deburred, each tube end may be flared, one end may be connected to a debris-collecting nozzle while the other end is subjected to a blast of compressed air to blow-out the tube, a manifold may be connected to each end for a flush-etching operation using an acid followed by a water rinse to size and clean the tube inside surface, nozzles may be connected to each end to pass dry air through the tube, and plugs may be temporarily inserted into each tube end for the tube to undergo an underwater ultrasonic inspection, etc. The cladding tubes are normally processed in batches or sets with tubes having the same length within a set. Control rods and burnable absorber rods, which also are used in nuclear reactors, have tubes whose ends undergo similar processing operations. Cladding tubes become fuel rods with additional tube-end processing steps including: inserting and girth welding an end plug to one tube end, loading fuel pellets into the tube from the open tube end, inserting and girth welding an end plug to the open tube end, internally pressurizing the tube through a hole in one end plug, seal welding the pressurization hole, and inspecting the welds. Other end processing procedures are possible for tubes used in diverse applications.

An important consideration during the manufacture of nuclear fuel rods is avoiding excessive tube flexing. To prevent fuel pellet damage, a loaded fuel rod must be supported and moved such that it is kept straight within specified tolerances. An excessively flexed fuel rod must be rejected.

Typical tube end processing systems transversely move the tubes between tube-end-processing stations using conveyors, such as walking beams. A tube then is longitudinally moved to and from a tube-end-processing machine, usually by rollers. Different length tubes are accommodated since such systems do not simultaneously process both ends of a tube.

U.S. Pat. No. 4,300,672 discloses improved apparatus for fabricating tubing which accommodates different length tubing and which can be used to simultaneously process both ends of a tube. In that patent, a conveyor and the tube-end-processing machines for one tube end are mounted on a fixed module, and a conveyor and the tube-end-processing machines for the other tube end are mounted on a movable module (to accommodate different length tubing).

What is needed is a tube-end-processing system which can accommodate different length tubing and simultaneously process both ends of a tube while having the versatility to accept different tube-end-processing machines into the system and all without excessive tube flexing and without the need for a massive structure to support a line of machines for one tube end and to support and move (to accommodate different length tubing) a line of machines for the other tube end.

SUMMARY OF THE INVENTION

It is an object of the invention to provide a tube-end-processing system for simultaneously processing both ends of a tube.

It is another object of the invention to provide such a system which can accommodate different length tubing.

It is a further object of the invention to provide such a system which has the versatility to incorporate different tube-end-processing machines in the system.

It also is an object of the invention to provide such a system which does not require a massive structure to support or move the machines.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the system, for processing the first and second ends of tubes, includes a stationary support surface, a tube conveyor, first-tube-end-processing machines, second-tube-end-processing machines, and a controller. The conveyor supports and transversely moves each tube to predefined first and second tube-end-processing sites. The conveyor, which is adjustable for different tube length, is placed on the support surface but is spaced up from the support surface at the first processing sites to create first machine-base-access areas. The first machines each have a separate and stationary base and a tube-end-processing module movably mounted thereon. The base is positioned on the support surface with a portion underneath the conveyor in a first machine-base-access area with the module movably positionable (to accommodate different length tubing) near a corresponding first processing site. The second machines each have a tube-end-processing module positioned near a corresponding second processing site. The controller activates the conveyor to move the tubes to the processing sites and actuates the machines to process the ends of the tubes at the processing sites.

In a preferred embodiment of the invention, a floor is chosen as the support surface.

In an exemplary embodiment of the invention, one of the first-tube-end-processing sites and one of the second-tube-end-processing sites are positioned such that the first module associated with the one first site is aligned with the second module associated with the one second site for simultaneous processing of both ends of the tube.

Several benefits and advantages are derived from the invention. The separate and stationary first machine base feature and the first machine-base-access area feature together allow the system to simultaneously process both ends of the tube and to accommodate different length tubing all with easy accommodation of different machines into the system and without requiring a massive structure to move the machines in response to different tube length.

DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Figure 1:
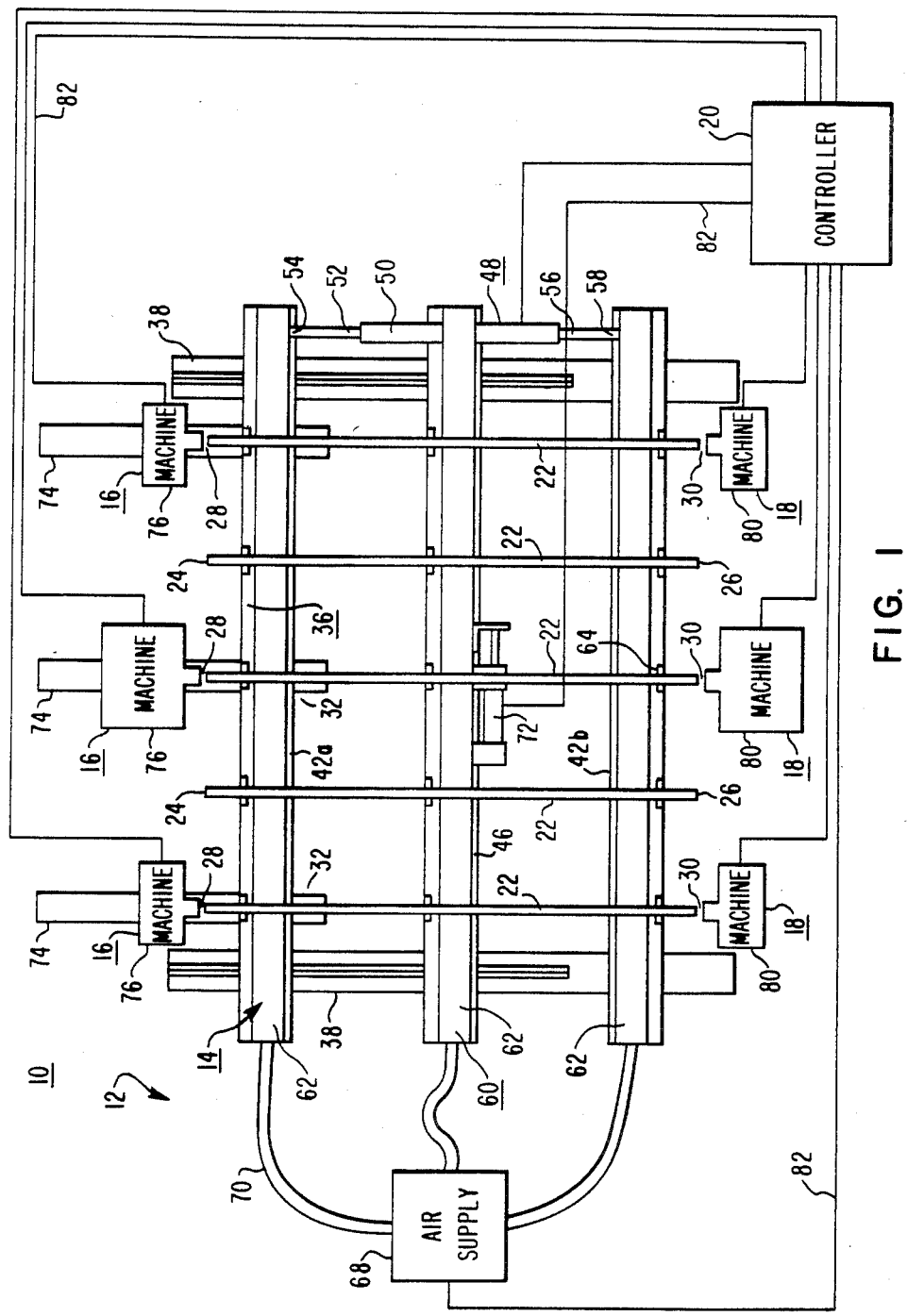
FIG. 1 is a schematic plan view of the tube-end-processing system.

Reference will now be made in detail to several present preferred embodiments of the invention, some examples of which are illustrated in the accompanying drawings. In the drawings, like reference characters designate like or corresponding parts throughout the several views.

The tube-end-processing system 10, as seen schematically in FIG. 1, includes a stationary support surface 12, a conveyor mechanism 14, first-tube-end-processing machines 16, second-tube-end-processing machines 18, and a controller 20. Preferably, the factory floor defines the stationary support surface 12.

The conveyor mechanism 14 (also seen in FIG. 2) provides means for supporting and transversely moving each tube, such as nuclear fuel rod cladding tubes 22 having first ends 24 and second ends 26, to predefined first-tube-end-processing sites 28 and to predefined second-tube-end-processing sites 30. The conveyor mechanism 14 is placed on the stationary support surface 12, but is spaced up therefrom at the first processing sites 28 to create first machine-base-access areas 32. Also, the conveyor mechanism 14 is adjustable for supporting different length tubes 22.

Preferably, the conveyor mechanism 14 includes a frame 36 having two stationary support rails 38 disposed on the stationary support surface 12 through intermediate ports 40. The rails 38 are parallel to each other and longitudinally extending (i.e., being oriented parallel to the longitudinal axis of the tubes 22 being supported on the conveyor mechanism 14). The frame 36 also has at least two crosspieces 42 mounted on the rails 38. The crosspieces 42 are parallel to each other and transversely extending (i.e., being oriented transverse (perpendicular) to the longitudinal axis of the tubes 22 being supported on the conveyor mechanism 14). The posts 40 cause the crosspieces 42 to be spaced up from the stationary support surface 12 creating the first machine-base-access area 32. At least one of the crosspieces 42a is transversely slidable longitudinally along the rails 38 to accommodate different length tubes 22. Preferably it is so slidable via grooves 44 in the crosspieces 42a, while the other crosspiece 42b preferably is transversely immovable with respect to the rails 38, being transversely fixed thereto.

In an exemplary embodiment, the frame 36 also has a crossbar 46 which is generally identical with the crosspieces 42, preferably the transversely slidable crosspiece 42a. The crossbar 46 is mounted on the rails 38 between, and parallel to, the crosspieces 42a and 42b. Additional crossbars 46 may be employed, as needed, to adequately support the tubes 22 to avoid undesirable tube flexing and abrasion. Other frame arrangements include a frame having only crosspieces with wheels rolling on floor-mounted tracks wherein the machine-base-access areas are floor trenches, a frame having only support rails wherein the space between a pair of rails defines a machine-base-access area and the rails are each topped with a separate and slidable pad, and the like, as is known to those skilled in the art.

Optionally, the tube-end-processing system 10 includes drive means for slidably moving the transversely slidable crosspiece 42a on the rails 38 to adjust the frame 36 to handle a batch of different length tubes 22. Preferably, such means includes a double-piston powered cylinder, such as a hydraulic or pneumatic cylinder 48 having a cylinder portion 50 affixed to the transversely slidable crossbar 46, a first piston 52 having a terminus 54 attached to the transversely slidable crosspiece 42a, and a second piston 56 having a terminus 58 attached to the transversely immovable crosspiece 42b. If the frame 36 contains additional crossbars 46, the drive means would contain additional powered cylinders and the crossbars made transversely slidable or immovable depending on the particular application, as can be appreciated by those skilled in the art. Other drive means include a reversible motor and chain drive to move each transversely slidable crosspiece and crossbar, a hand-operated rope and pulley arrangement for each such crossmember, and the like, as is known to those skilled in the art.

Figure 2:
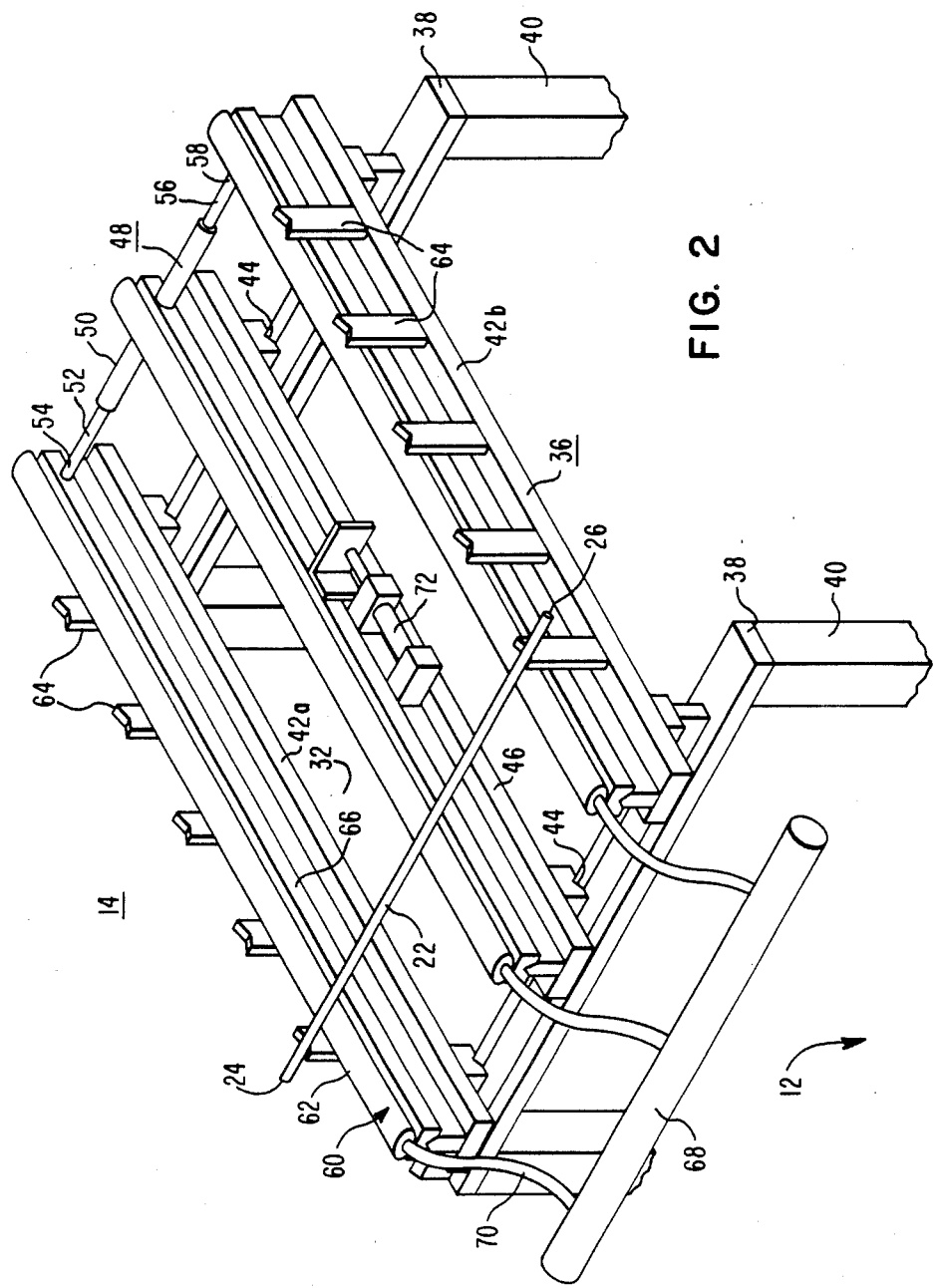
FIG. 2 is an isometric view of the conveyor mechanism portion of the system of FIG. 1 including the frame and the walking beam arrangement.

It also is preferred that the conveyor mechanism 14 include a walking beam 60 having an inflatable bladder 62 mounted on each crosspiece 42 of the frame 36, and on the crossbar 46 for those frames 36 having a crossbar 46. Mounting inflatable bladders 62 on each crossbar 46 insures that a flexible tube, such as a pellet-loaded nuclear fuel rod, will be conveyed without excessive bowing. Specifically, the walking beam 60 includes tube support blocks 64 fixed to the crosspieces 42 and crossbar 46, and a support beam 66 for each inflatable bladder 62. In FIG. 2, the blocks 64 have been omitted from the crossbar 46 for clarity. Each inflatable bladder 62 is attached to its support beam 66 which is slidably mounted on a corresponding crosspiece 42 or crossbar 46. The walking beam 60 also includes an air supply 68 (only a portion of which is shown in FIG. 2) and flexible air lines 70 to inflate and deflate the bladders 62, and a powered cylinder 72 to longitudinally slide the support beams 66 on the crossbar 46 and (through the connection of the double-piston powered cylinder 48) on the crosspieces 42.

Walking beams, including their operation and use, are well known in the art. Briefly, the bladders 62 are inflated and raise the tubes 22 off the support blocks 64. Then the powered cylinder 72 moves the support beams 66 and hence the bladders 62 (and tubes 22) to the next support blocks 64. Here, the bladders 62 are deflated lowering the tubes onto the next support blocks 64, and the powered cylinder 72 returns the support beams back to their starting position. In this way, a short forward and back movement of the support beams 66 is used to move the tubes 22 along the entire length of the conveyor. Other tube moving arrangements for the conveyor mechanism 14, instead of the walking beam 60, include a continuous moving belt for each crosspiece and crossbar, an inclined rail for each crosspiece and crossbar with releasable tube stops to stop the tubes at the tube-end-processing sites, and the like, as is known to those skilled in the art.

The first-tube-end-processing machines 16 process the first ends 24 of the tubes 22 moved by the conveyor mechanism 14 to the first-tube-end-processing sites 28. Each such machine 16 has a separate and stationary first machine base 74 and a first-tube-end-processing module 76 movably mounted (such as slidably mounted) thereon. Each first machine base 74 is positioned on the stationary support surface 12 with a portion of the first machine base 74 placed underneath the conveyor mechanism 14 in a corresponding first machine-base-access area 32. To accommodate different length tubing, each first-tube-end-processing module 76 is movably disposable near a corresponding first-tube-end-processing site 28.

The second-tube-end-processing machines 18 process the second ends 26 of the tubes 22 moved by the conveyor mechanism 14 to the second-tube-end-processing sites 30. Each such machine 18 has a second-tube-end-processing module 80 positioned near a corresponding second-tube-end-processing site 30.

A tube-end-processing machine is any apparatus that performs any operation on the end of a tube, such as those previously discussed concerning nuclear fuel rod cladding tubes 22 and including such tube-end-processing operations as cutting, welding, marking, inspecting, testing, and the like. The number and type of such machines does not form a part of this invention and depends on the particular tube processing desired, which is left to those skilled in the art. Clamps (not shown) may be used to secure the tubes against longitudinal movement when their ends are being processed by the machines, as can be appreciated by the skilled artisan.

The tube-end-processing system 10 of the invention is best used to simultaneously process the first ends 24 and the second ends 26 of tubes 22. Some processing, such as flush-etching, requires simultaneous operations on both ends of the tubing. Other processing, such as deburring, can be done faster with simultaneous tube end operations. To that end, it is preferred that one (and better all) of the first-tube-end-processing sites 28 and one (all) of the second-tube-end-processing sites 30 be positioned so that their corresponding first- and second-tube-end-processing modules 76 and 80 are aligned for simultaneously processing the ends 24 and 26 of a tube. All of the machine modules 76 and 80 in FIG. 1 are so aligned. To employ the tube-end-processing system 10 advantageously, it is desirable to utilize at least two first-tube-end-processing machines 16 and at least two second-tube-end-processing machines 18. If some of the processing sites are chosen not to be aligned, so that some tube ends are not simultaneously processed, powered rollers can be used to longitudinally move a tube towards and away from a machine module (if necessary, replacing tube supports 64 at any desired work station).

The controller 20 of the tube-end-processing system 10 provides means for activating the conveyor mechanism 14 and for actuating the first- and second-tube-end-processing machines 16 and 18. The conveyor mechanism 14 is activated to move the tubes 22 to the first- and second-tube-end-processing sites 28 and 30. The first machines 16 are actuated to process the first ends 24 of the tubes 22 at the first-tube-end-processing sites 28, and the second machines 18 are actuated to process the second ends 26 of the tubes 22 at the second-tube-end-processing sites 30. The controller 20 commands the conveyor mechanism and the machines by sending signals over communication lines 82. In an exemplary embodiment, the controller 20 also commands the air supply 68 and the powered cylinder 72 to operate the walking beam 60 as well as the double-piston powered cylinder 48 used to move the crosspieces 42 to accommodate different length tubes 22. Preferably, the controller 20 is a computer, but any type controller will suffice, such as a timer-relay arrangement, a manually rotated sequencing switch, and the like, as is known to the skilled artisan.

The predefined tube-end-processing sites 28 and 30 are chosen, as can be appreciated by those skilled in the art, to meet a particular tube end processing application. It is noted that by having a common support apparatus only for the tubing, and not for the machines, additional machines can be added easily to the system at newly defined processing sites, such as between the existing machines 16 and 18 shown in FIG. 1, and existing machines can be exchanged.

It will be apparent that many modifications and variations are possible in light of the above teachings. For example, a particular application may call for a transversely immovable crossbar and transversely slidable crosspieces, or for the second-tube-end-processing machines to have their modules movably mounted on separate and stationary second machine bases with portions disposed underneath the conveyor in second machine-base-access areas (like the first-tube-end-processing machines). It, therefore, is to be understood that within the scope of the appended claims, the invention may be practiced other than as specifically described.

I claim:

1. A system, for processing first and second ends of tubes, comprising:
   (a) a stationary support surface;
   (b) a longitudinally extending stationary rail disposed on said support surface;
   (c) at least three transversely extending crossbars mounted on said rail for supporting each said tube, wherein at least two of said crossbars are transversely slidable longitudinally along said rail for supporting a different length said tube;
   (d) drive means for selectively and independently slidably moving said transversely slidable crossbars relative to each other on said rails;
   (e) conveyor means disposed on at least one of said crossbars for transversely moving each said tube to predefined first-tube-end processing sites and to predefined second-tube-end processing sites;
   (f) first-tube-end-processing machines each having a separate and stationary first machine base and a first-tube-end-processing module movably mounted on said first machine base, said first machine base disposed on said support surface in a first machine-base-access area, and having a portion disposed underneath one of said transversely slidable crossbars in a corresponding said first access area and said first module movably disposable proximate a corresponding said first processing site;

(g) second-tube-end-processing machines each having a second-tube-end-processing module disposed proximate a corresponding said second processing site; and (h) controller means for activating said conveyor means to move said tubes to said first and second processing sites and for actuating said first machines to process said first ends of said tubes at said first processing sites and said second machines to process said second ends of said tubes at said second processing sites.

2. The system of claim 1, wherein said support surface is a floor.

3. The system of claim 1, wherein one of said first processing sites and one of said second processing sites are disposed such that said first module associated with said one first processing site and said second module associated with said one second processing site are aligned for simultaneously processing said first and second ends of a said tube.

4. The system of claim 1, wherein said conveyor means are disposed on each said crossbar.

5. The system of claim 1, wherein said drive means includes a double-piston powered cylinder having a cylinder portion affixed to one of said transversely slidable crossbars, a first piston affixed to another said crossbar, and a second piston affixed to a second said slidable crossbar.

6. A system, for processing first and second ends of tubes, comprising:

(a) a stationary support surface;

(b) a longitudinally extending stationary rail disposed on said support surface;

(c) at least three transversely extending crossbars mounted on said rail for supporting each said tube, wherein at least two of said crossbars are transversely slidale longitudinally along said rail for supporting a different length said tube;

(d) walking beams disposed on at least two of said crossbars and having an inflatable bladder mounted on the top thereof for lifting and supporting said tubes and for transversely moving each said tube to predefined first-tube-end processing sites and to predefined second-tube-end processing sites;

(e) first-tube-end-processing machines each having a separate and stationary first machine base and a first-tube-end-processing module movably mounted on said first machine base, said first machine base disposed on said support surface in a first machine-base-access area, and having a portion disposed underneath one of said transversely slidable crossbars in a corresponding said first access area and said first module movably disposale proximate a corresponding said first processing site;

(f) second-tube-end-processing machines each having a second-tube-end-processing module disposed proximate a corresponding said second processing site; and (g) controller means for activating said walking beams to move said tubes to said first and second processing sites and for actuating said first machines to process said first ends of said tubes at said first processing sites and said second machines to process said second ends of said tubes at said second processing sites.

7. A conveyor system comprising:

a first stationary support rail;

a second stationary support rail disposed apart from and substantially parallel to said first stationary support rail;

a plurality of walking beams slidably disposed on and generally perpendicular to said support rails with each having an inflatable bladder mounted on the top thereof for lifting, supporting and moving objects along the length of said walking beams; and drive means connected to said walking beams for selectively and independently sliding said walking beams relative to each other on said rails.

8. The conveyor system according to claim 7 wherein said plurality of walking beams comprises three generally elongated walking beams separately mounted on said rails, at least two of which being independently slidable along said rails relative to each other.

9. The conveyor system according to claim 8 wherein one of said walking beams is stationary.

10. The conveyor system according to claim 9 wherein said drive means comprises a powered cylinder connected between both of the independently slidable walking beams for sliding the independently slidable walking beams relative to each other.

11. The conveyor system according to claim 10 wherein the stationary walking beam is not disposed between the slidable walking beams.

* * * * *